United States Patent [19]

Mir

[11] 4,366,499

[45] Dec. 28, 1982

[54] ELECTRONIC COLOR IMAGING APPARATUS HAVING IMPROVED COLOR CONTROL DEVICE

[75] Inventor: José M. Mir, Rochester, N.Y.

[73] Assignee: Eastman Kodak Company, Rochester, N.Y.

[21] Appl. No.: 230,096

[22] Filed: Jan. 29, 1981

[51] Int. Cl.³ ............................................... H04N 1/46
[52] U.S. Cl. ....................................... 358/75; 358/78; 358/80
[58] Field of Search ........................ 358/60, 61, 75, 78, 358/80, 285, 286, 296, 300, 302; 355/4, 5, 18, 32, 37, 38, 67, 70, 71; 353/20; 350/356, 370, 378, 374, 380, 400, 403

[56] References Cited

U.S. PATENT DOCUMENTS

| | | | |
|---|---|---|---|
| 3,428,743 | 2/1969 | Hanlon | 358/61 |
| 3,470,310 | 9/1969 | Shashova | 358/61 |
| 3,930,119 | 12/1975 | Schmidt | 358/285 |
| 4,129,357 | 12/1978 | Frosch | 350/403 |
| 4,229,095 | 10/1980 | Mir | 358/75 |
| 4,294,524 | 10/1981 | Stolov | 358/59 |
| 4,316,196 | 2/1982 | Jacobs | 350/356 |

Primary Examiner—Michael A. Masinick
Attorney, Agent, or Firm—John D. Husser

[57] ABSTRACT

Electronic color imaging apparatus of the type having an image exposure control means including a plurality of electrically-addressable pixel light valves for selectively controlling the passage of light to different pixel regions of an imaging zone in response to information signals, is provided with improved electro-optic color control means. Such color control includes a plurality of strip modulators which respectively control the passage of one of a plurality of light colors and synchronization control means activate the exposure control means and color control means in proper timed relation such that the pixel light valves are activated with the appropriate information for the light color then passing the color control means.

4 Claims, 4 Drawing Figures

ELECTRONIC COLOR IMAGING APPARATUS HAVING IMPROVED COLOR CONTROL DEVICE

CROSS-REFERENCE TO RELATED APPLICATIONS

Reference is made herein to U.S. patent application Ser. No. 230,089, entitled "Light Valve Imaging Apparatus Having Improved Optical Configuration" filed Jan. 29, 1981, in the name of J. R. Varner; U.S. patent application Ser. No. 230,099, entitled "Light Valve Imaging Apparatus Having Improved Addressing Electrode Structure," filed Jan. 29, 1981, in the names of J. M. Mir and J. R. Varner; U.S. patent application Ser. No. 230,092, entitled "Improved Light Valve Imaging Apparatus and Method for Providing Gray Scale," filed Jan. 29, 1981, in the name of J. M. Mir; U.S. patent application Ser. No. 230,098, entitled "Electronic Color Imaging Apparatus Having Integral Multicolor Arrays," filed Jan. 29, 1981, in the names of C. N. Kurtz, J. M. MIr and J. R. Varner and U.S. patent application Ser. No. 230,095, entitled "Light Valve Imaging Apparatus With Optimized Addressing Potential(s) to Reduce Inter-Pixel Nonuniformity," filed Jan. 29, 1981, in the name of J. M. Mir.

BACKGROUND OF THE INVENTION

1. Field of the Invention

The present invention relates to apparatus and method for forming a color image from an electrical signal and more particularly to improvements in electronic color imaging apparatus and method of the kind using an array of light valves.

2. Brief Description of the Prior Art

U.S Pat. No. 4,229,095 discloses various embodiments of electronic color-imaging apparatus that utilize arrays of separately-addressable, pixel (picture element) sized, electro-optical means to effect multicolor exposure of panchromatic imaging media. One preferred kind of electro-optical means disclosed in that patent is a light valve comprising a panel of ferro-electric ceramic material, such as lanthanum-doped lead zirconate titanate (PLZT) sandwiched between crossed polarizers and activated to operate in a quadratic Kerr cell mode. Thus an array of such light valves comprises a panel of PLZT material with a plurality of interleaved electrodes formed on one major surface in a manner facilitating the selective application of discrete electrical fields transversely across (in a direction perpendicular to the direction of viewing) discrete surface areas of the plate. Upon application of such fields, the PLZT material becomes birefringent and rotates the direction of polarization of incident light by an extent dependent on the field magnitude. This results in the transmission of light through the PLZT panel and polarizers varying as a function of the electric fields. A color image is formed electronically by selectively opening and closing of such light valves in synchronization with pulses of red, green and blue light and according to the red, green and blue color information for the pixels of that image.

The above-mentioned patent discloses two preferred approaches for providing such successive pulses of different color light. In one approach separate radiation sources, such as separate elongated flash lamps with respective red, green and blue filters, are energized successively by a controllable power source. In the other approach a rotating member, having successive red, green and blue filter sectors is interposed between a single illumination source and the light valve array.

The above approaches are completely suitable for many electronic imaging applications; however, in certain electronic imaging applications they each have some undesirable features. The multiple-lamp approach involves three, instead of one, illuminating sources and thus some additional costs. Moreover, there are certain limits as to how fast these sources can be turned on and off and for higher speed imaging applications, this can present a problem. The rotating filter approach avoids both of the aforementioned potential difficulties; however, it involves precise synchronization of the filters' movement and thus involves the cost of precise servosystems, as well as potential operational difficulties in higherspeed applications.

SUMMARY OF THE INVENTION

It is a primary purpose of the present invention to provide color electronic imaging apparatus of the general kind described in my previously mentioned patent, but having improved configurations and approaches for avoiding the above-described potential difficulties. Thus, one advantage of the present invention is the provision of multicolor illumination pulses in a simple but precise manner. Neither multiple illumination sources nor precise electro-mechanical synchronization systems are required by the illumination approach of the present invention. Another highly significant attribute of the present invention is that it can provide pulses of extremely short and precise duration.

These advantages are attained in accordance with one preferred electronic color imaging embodiment of the present invention by providing illuminating means for directing multicolor light toward recording medium at an imaging zone of such apparatus, pixel light valve control means electrically-addressable to control the passage of such light to discrete pixel regions of the exposure station, a color control means including electro-optic strip modulators respectively electrically-activatable for controlling the passage of light of a different one of such colors, and addressing means for receiving a color image signal and for selectively activating the pixel control means and the color control means so that passage of light through the pixel light valves is controlled in accordance with the color information that pertains to the light color then passing the color control means.

BRIEF DESCRIPTION OF THE DRAWINGS

The subsequent more detailed description of various exemplary preferred embodiments of the present invention refers to the attached drawings wherein.

DETAILED DESCRIPTION OF THE PREFERRED EMBODIMENTS

Figure 1:
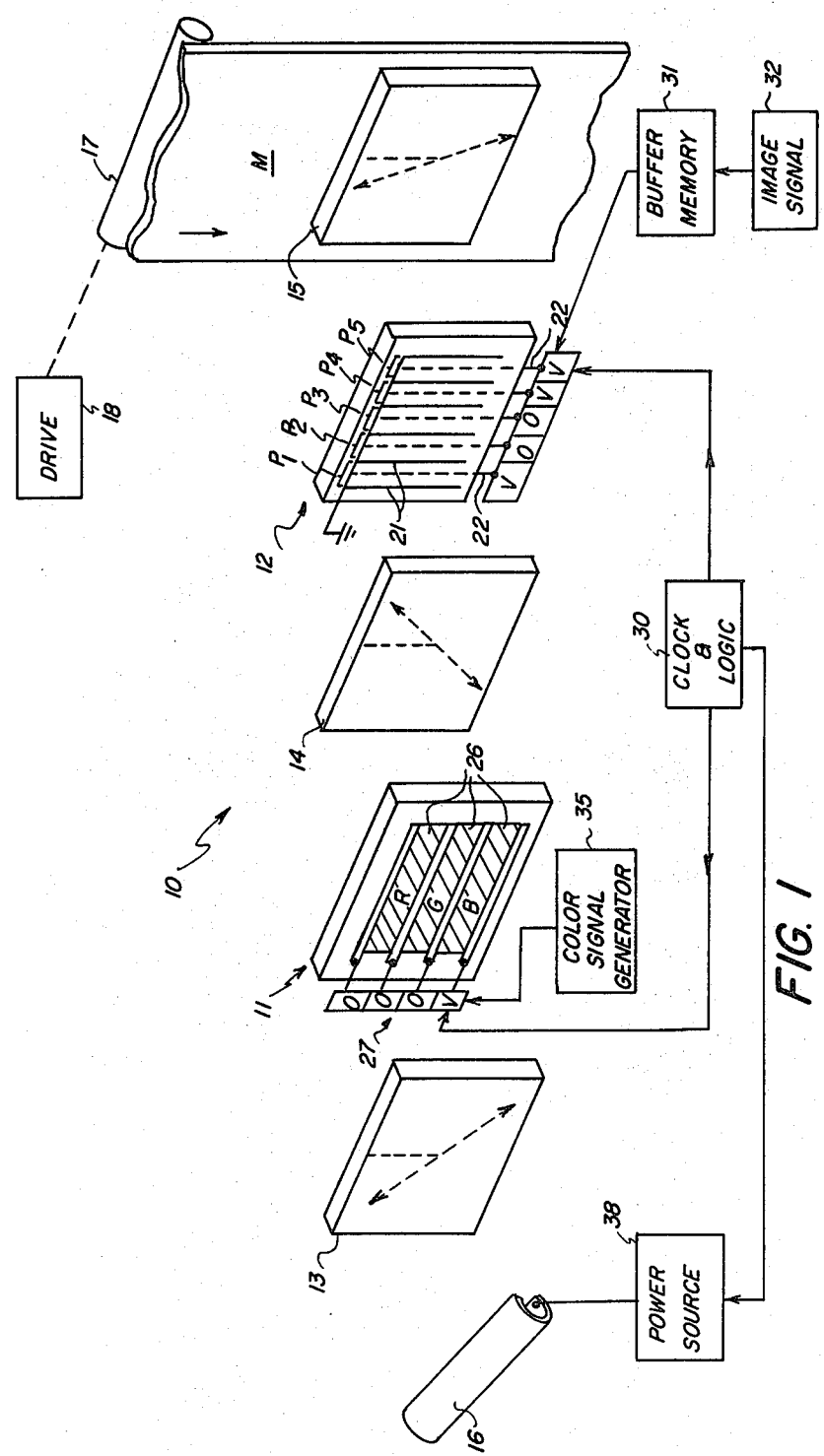
FIG. 1 is a schematic illustration, in exploded perspective, of one preferred embodiment of the present invention.

FIG. 1 schematically illustrates one preferred embodiment which can accomplish electronic imaging in accordance with the present invention. The apparatus, denoted generally 10, comprises first and second electro-optic modulators 11 and 12 and entrance, intermediate and exit light polarizing means 13, 14 and 15. It will be appreciated that dimension and configuration of the modulators and polarizers will vary depending upon the application in which the array is to be used. Generally, the elements will be approximately uniform in their major dimensions.

The area modulators 11 and 12 preferably are formed of electro-optic material of the type which transforms from a non-polar, optically-isotropic state to a polar, strongly-birefringent state when an electrical field is applied thereacross. PLZT ferroelectric ceramic of a kind known in the art (see, e.g., U.S. Pat. No. 3,612,656; U.S. Pat. No. 3,998,523 and U.S. Pat. No. 4,053,207) is a preferred class of material; however, there are various other well known materials which exhibit the desired electro-optic behavior described above. One specific preferred material is 9/65/35 PLZT. The area modulators can be formed as a unitary panel or as a plurality of separate panels, e.g., strips supported together to define a two-dimensional imaging area.

The polarizers can be selected from various known materials such as sheet polarizing materials which exhibit dichroism, e.g. Polaroid sheet polarizers. In certain applications other light polarizing techniques such as Nichol prisms and Brewster mirrors may be useful.

As shown in FIG. 1, the modulators and polarizing means are arranged along an optical axis A in a predetermined sequence and orientation. Specifically, modulator 11 is located between entrance polarizing means 13 and intermediate polarizing means 14, and modulator 12 is located between polarizing means 14 and exit polarizing means 15. It is to be noted that the polarizing means each can comprise multiple sheet polarizers with aligned directions of polarization as indicated in FIG. 1. In this regard, there is a particularly significant increase in contrast ratio when the intermediate polarizing means 14 comprises two sheet polarizers which are mutually aligned as to direction of polarization.

Usually it will be desirable to dispose the elements in closely spaced relation; however, in certain embodiments other light directing optical elements e.g. such as mirrors and prisms can be interposed along the optical path. Thus, although the modulators need not be arranged in a straight line they should be generally optically aligned. As indicated in FIG. 1, the polarization direction of the entrance and exit polarizing means 13 and 15 are the same and the polarization direction of the intermediate polarizing means 14 is orthogonal to those of the other polarizers.

A source of uniform, multicolor illumination 16 is located to direct light generally along axis A, illuminating the entire surface of entrance polarizing means 13 uniformly. It is highly preferred that such illumination be substantially collimated in a direction normal to the major surfaces of the polarizers and modulators. Copending U.S. patent application Ser. No. 230,089, entitled "Light Valve Imaging Apparatus Having Improved Optical Configuration" and filed Jan. 29, 1981, in the name of J. R. Varner, discloses one preferred technique for so collimaging the illumination and is incorporated herein by reference. At the opposite end of axis A means, e.g. roller 17 coupled to drive 18, are provided for supporting a recording medium M and moving it past an exposure station opposite exit polarizing means 15. It will be appreciated that suitable means, e.g. a lens, not shown, will be provided between polarizing means 15 and the image medium to image the light valve at the exposure station.

As shown in FIG. 1, the modulators 11 and 12 are divided into a plurality of independently addressable strip portions (R, G, B and $P_1$-$P_5$) by strip electrodes extending across their major surfaces in predetermined configurations. Referring first to modulator 12, it can be seen that a plurality of linear electrodes 21 extend from a common line along the top of the modulator in a parallel spaced relation to the bottom of the modulator, a plurality of addressing electrodes 22 extend in parallel spaced relation toward the top of the modulator, interleaved between electrodes 21. In one mode for address, the electrodes 21 can be coupled to a common source of reference potential, e.g. ground and the electrodes 22 selectively energized to an activating potential level. Thus zones ($P_1$-$P_5$) between adjacent pair of electrodes 22 form light-modulating strip portions transversely across the path of the recording medium M as it moves past the exposure zone. Other electrode configurations and an electrode addressing approach particularly useful for continuous tone imaging are disclosed in U.S. patent application Ser. No. 230,099, entitled "Light Valve Imaging Apparatus Having Improved Addressing Electrode Structure," filed Jan. 29, 1981, in the names of J. M. Mir and J. R. Varner, and U.S. patent application Ser. No. 230,092, entitled "Improved Light Valve Imaging Apparatus and Method for Providing Gray Scale," filed Jan. 29, 1981, in the name of J. M. MIr, which is incorporated herein by reference.

The modulator 11 shown in FIG. 1 has a slightly different electrode arrangement; however, it can also be formed like modulator 12 but with the strip portions in an orthogonal direction. Instead, in the illustrated embodiment, the modulator 11 comprises a plurality of separately-addressable linear electrodes 26 extending horizontally across the modulator and coupled to an addressing source 27 adjacent the modulator. To activate one of the light-modulating strip portions (R, G, B), it is necessary that the adjacent electrodes 26 defining that portion be at different potential levels to form the activating electrical field thereacross. This can be done in an electrically efficient fashion, which will be described subsequently, for the preferred embodiment disclosed. Different color filter layers, e.g. red, green and blue, are respectively provided on the strips R, G, B of modulator 11 so that only light of that particular color can be transmitted. These layers can be coated on the modulator portions or supported in appropriately aligned relation. More detailed description of techniques for forming such filters is disclosed in U.S. patent application Ser. No. 230,098, entitled "Electronic Color Imaging Apparatus Having Integral Multicolor Arrays," filed Jan. 29, 1981, in the names of C. N. Kurtz, J. M. MIr and J. R. Varner which is incorporated herein by reference.

It should be noted that it is preferred in this embodiment of the present invention that the electric fields applied across strip portions R, G, B and $P_1$-$P_5$ be in a direction perpendicular to the optical axis A. Thus as used herein the phrase "transversely across" is used with respect to electric fields to distinguish this preferred field direction in contrast to the direction across the thickness of the element (i.e., in a direction parallel to the optical axis A). The significance of this aspect is that this mode of field application results in light modulation in the transverse or Kerr mode rather than in the longitudinal or scattering mode. One preferred mode for activating such electrodes to an optimized potential level(s) is disclosed in U.S. patent application Ser. No. 230,095, entitled "Light Valve Imaging Apparatus With Optimized Addressing Potentials to Reduce Inter-Pixel Nonuniformity" and filed Jan. 29, 1981, in the name of J. M. Mir, which is incorporated herein by reference.

One preferred mode of operation for the above-described electronic color imaging apparatus will now be explained as it is effected by the related addressing and illuminating elements also shown schematically in FIG. 1. Thus, under the control of clock 30, buffer memory 31 outputs to addressing source 25 (e.g., a shift register) for modulator 12 the pixel information for a particular color content of a line of image information, which it has received and stored from image signal source 32. During this same period color signal generator 35 outputs a color signal to addressing source 27 (e.g., a shift register) for modulator 11, also under the control of clock 30. Thereafter clock 30 initiates an address signal which causes the addressing sources 27 and 25 to energize electrodes 22 and 26 in accordance with the information clocked therein. At this stage illuminating means 16 has been energized by power source 38 to effect uniform illumination of modulator 11 through polarizing means 13 with panchromatic light.

Assuming the address sources to be loaded with information as shown (i.e., "V" — energize the coupled electrode; "O" — do not energize the coupled electrode), pixel regions $P_1$, $P_4$ and $P_5$ will be exposed to blue light. This can be explained as follows. In modulator 11, only the electrodes defining strip B have a potential differential and thus an electrical field is present only transversely across strip B. Polarized light directed onto the surface of modulator 11 thus passes through strips G and R without modulation but such light passing through strip B is rotated 90° because that strip portion is now in its polar birefringent state. Upon exiting modulator 11, the light from strips G and R is blocked by cross polarizing means 14, but the light exiting strip B (having been rotated 90°) passes polarizing means 14 and forms an illuminated strip of blue light (orthogonal to strips $P_1$–$P_5$) on modulator 12. By virtue of their addressed activation, pixel regions $P_1$, $P_4$ and $P_5$ of modulator 12 are in the polar, birefringent state and rotate light passing therethrough 90°. Non-activated strips $P_2$ and $P_3$ do not rotate light falling thereon. Thus light passing activated strips passes polarizing means 15 (which is cross relative to polarizing means 14) and light passing non-activated strips is blocked by polarizing means 15. Upon completion of the blue color imaging of the line, color signal generator 35 activates an input to addressing source for the color control modulator to energize a different color strip of modulator (e.g., by actuating the shift register 27 so that the first two elements thereof are "V"). New pixel region information for the green color imaging of a line is input to source 25 and the activation stage is repeated as previously described. Subsequent addressing of register 27 and corresponding input to pixel regions of modulator 12 will provide red color exposure of a line.

At this stage it should be noted that at least two different approaches are possible for the sequence of line information addressed to modulator 12. First, the pixel color information addressed to modulator 12 during the successive R, G, B activations of modulator 11 can be for the same transverse line of the image medium. In this instance the optical means between polarizing means 15 and the exposure station would be designed to direct the spaced red, green and blue light strip portions which pass modulators 11 and 12 to a common line zone at the exposure station (e.g. anamorphic optics). In a second approach the buffer memory can include signal processing means which provide appropriate line delays to image color signals. Thus in a given activating sequence of sequential R, G, B pulses from modulator 11, th pixel modulator 12 would be addressed with different image line information for each different color pulse. If it is assumed for the FIG. 1 configuration that the first expose transverse line of medium M is line 1, then the pixel information to modulator during the blue pulse would be e.g. for line 17, while the pixel information to the modulator 12 during the green and red pulses of that sequence of color modulator 11, would be respectively for line 18 and 19.

Considering the above-described structure and mode of operation, it will be appreciated that modulator 11 in cooperation with crossed polarizing means 13 and 14 constitute a color control array that is capable of controlling the passage of particular light colors in response to addressing electrical signals. Similarly, it will be appreciated that modulator 12 in cooperation with crossed polarizing means 14 and 15 constitute a light valve array for controlling light passage to a plurality of pixel regions, arranged transversely across the exposure station, in response to addressing electrical signals. Thus a complete color image can be electro-optically recorded on the medium as it moves past these cooperating modulators, if the addressing means activates the light valve array in proper synchronization with the color control array, i.e. so that its valves are activated in accord with the color information that pertains to the light color then passing the color control array.

Within the scope of the present invention, there are various configurations and operational sequencing that can be made to those just described. For example, the positions of modulator 11 and 12 could be interchanged on the optical axis. Also, modulators other than the specific types described could be utilized.

Figure 3:
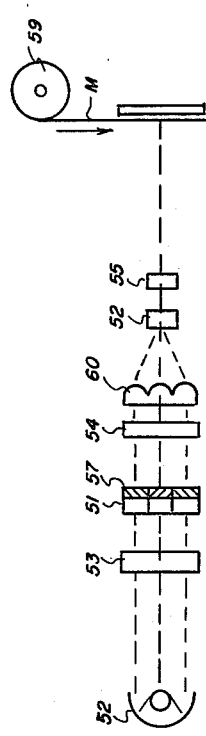
FIG. 3 is a schematic cross-sectional view of an alternative embodiment of the present invention.
Figure 4:
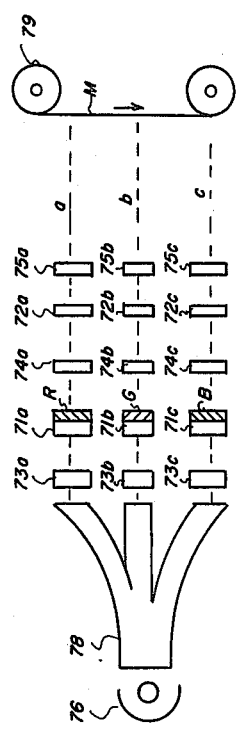
FIG. 4 is a schematic cross-sectional view of another alternative embodiment of the present invention.
Figure 2:
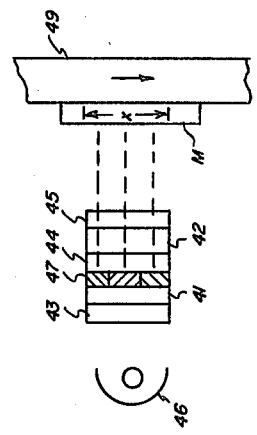
FIG. 2 is a schematic cross-sectional view of an embodiment similar to that shown in FIG. 1.

FIGS. 2-4 schematically illustrate some exemplary embodiments of different configurations which can be utilized according to the present invention. The device 40 shown in FIG. 2 comprises a lamp source 46, polarizers 43, 44 and 45 and modulators 41 and 42, all similar to those described with respect to FIG. 1. A filter array 47 is aligned with the respective strip formed by electrodes of electro-optic modulator 41. In this embodiment it is to be noted that the respective R, G and B line exposures occur at different locations along the path on which recording medium M is supported and moved through the exposure station, e.g. by a vacuum platen 49. If the size of zone X on the recording medium is sufficiently small, the different color exposures for that zone will be visually integrated and the zone can be considered a line of pixels. If the zone is larger than will be integrated by the viewer, i.e. the sub-zones can be resolved, then it will be desirable to allow appropriate time delays between successive R, G, B line exposures to allow the movement of the recording medium to provide registration or to provide appropriate optical means, e.g. anamorphic optics between the polarizer 45 and the exposure station.

The device 50 shown in FIG. 3 shows another way to accomplish overlap of different color exposures of an image line. This device comprises illumination source 56, entrance polarizer 53, modulator 51, color strip filter array 57 and intermediate polarizer 54 as described above. However, upon exiting polarizer 54, the different color light strips are all directed by anamorphic optics comprising e.g., cylindrical lenslet array 60, onto the same linear array 52 of discretely-addressable electro-optic pixels. The light passing array 52 enters an aligned strip polarizer 55 and is recorded on material M fed by drive means 59 past the exposure zone.

The device 70 shown in FIG. 4 represents another alternative embodiment. As shown, the device comprises linear strip polarizers 73-c, 74a-c and 75a-c which are located along their respective optical axes in relation to linear modulators 71a-c and 72a-c in a manner similar to the other devices previously described. The separate light paths defined by these elements have respectively a red R, green G and blue B filter aligned thereacross. Modulators 71a-c have spaced horizontal electrodes (not shown) which define a single electro-optical strip. Modulators 72a-c have a plurality of linear electrodes similar to modulator 12 of FIG. 1 but only extending a single pixel height. Light from illumination source 76 is piped, e.g. by fiber optic means 78 to each of the separate optical axes. Addressing of the elements on the different axes can occur concurrently, e.g. red information for a line 3 being addressed to the "a" axis elements, while information for a line 2 is addressed to the "b" axis elements and information for a line 1 is addressed to the "c" axis elements. It will be understood that by suitable signal processing, the image information can be reformatted appropriately. Thus when line of the medium M reaches the b axis, its green information will be addressed to linear light valve array 72b and when it reaches the c axis, its blue information will be addressed to linear light valve array 72c.

The invention has been described in detail with particular reference to certain preferred embodiments thereof, but it will be understood that variations and modifications can be effected within the spirit and scope of the invention.

What is claimed is:

1. Apparatus adapted for electronic color imaging, said apparatus including:
    (a) means defining an imaging zone;
    (b) illumination means for directing uniform, multicolor light toward said imaging zone;
    (c) pixel exposing means including at least one pixel array located between said illumination means and said imaging zone and comprising a plurality of discreet light valves that are each aligned with a different pixel region across said imaging zone, each of said light valves being discretely activatable electrically to control the passage of light from said illumination means to its respective pixel region;
    (d) color control means including a plurality of electro-optic strip modulators located between said illumination means and said imaging zone in optical alignment with said pixel exposing means and being electrically-activatable between first and second states for selectively controlling the passage of light to said imaging zone between different ones of a plurality of different colors; and
    (e) addressing means for receiving a color image signal and for selectively activating said pixel exposing means and said color control means so tha the imagewise passage of light through said pixel exposing means is controlled in accordance with the color image information that pertains to the light color then passing said color control means.

2. In apparatus adapted for electronic color imaging on a photosensitive medium of the type capable of recording different colors and comprising means for moving such a medium along an exposure path, illuminating means for directing multicolor light toward an exposure zone extending across said path and pixel exposing means located between said illuminating means and said exposure zone and including (1) a plurality of discrete pixel modulator portions, each respectively located at different positions across said path and individually activatable between isotropic and birefringent states in response to removal and application of an electric field; (2) a pair of light-polarizing means located on opposite sides of said pixel modulator portions and having their respective directions of polarization generally orthogonal, and (3) addressing means for independently activating said pixel modulator portions, the improvement comprising:
    (a) color control means optically aligned with said pixel exposing means and having a plurality of discrete color modulator portions, each including a strip of electro-optic material that is activatable between isotropic and birefringent states in response to removal and application of an electric field and respectively adapted to control transmission of light of a different light color in response to such activation; and
    (b) activation control means for activating said color control means and said pixel exposing means in timed relation such that the pixel modulator portions are activated in accordance with the proper image information for the light color being transmitted by said color control means.

3. Apparatus adapted for electronic color imaging with a photosensitive medium capable of recording different colors of light, said apparatus including:
    (a) means for supporting such a medium at an exposure station of said apparatus;
    (b) illumination means for directing multicolor light toward said exposure station;
    (c) a transverse pixel array of discrete light valves, located between said illumination means and said exposure station, that are each aligned with a different pixel region of said exposure station and each electrically-activatable individually to control the passage of light from said illumination means to its respective pixel region;
    (d) a color control array of electro-optic strip modulators located between said illumination means and said exposure station, each strip modulator extending transversely across said exposure station and being electrically-activatable between first and second states for controlling the passage of light of a different one of said colors from said illumination means to said exposure station; and
    (e) addressing means for receiving a color image signal and for selectively activating said light valves and said strip modulators so that the passage of light through said light valves is controlled in accordance with the color image information that pertains to the light color then passing said color control array.

4. In apparatus adapted for electronic color imaging on a photosensitive medium of the type capable of recording different colors and comprising means for moving such a medium along an exposure path, illuminating means for directing multicolor light toward an exposure zone extending across said path and an electro-optic array located between said illuminating means and said exposure zone and including (1) a plurality of discrete pixel modulator portions, each respectively located at different positions across said path and individually activatable between isotropic and birefringent states in response to removal and application of an electric field; (2) a pair of light-polarizing means having their respective directions of polarization generally orthogonal, a first of said polarizing means being located between said source and said pixel modulator portions and said exposure zone and the second of said polarizing means being located between said pixel modulator portions and said illuminating sorce and (3) addressing means for independently activating said pixel modulator portions, the improvement comprising:

(a) a plurality of discrete color modulators each including a strip portion that is activatable between isotropic and birefringent states in response to removal and application of an electric field, optically aligned, differently colored, light filter means and third light polarizing means, said strip portions being located between said electro-optic array and one of said exposure zone and said illuminating source and oriented transversely to said path and said third polarizing means being located on the opposite side of said strip portions from said electro-optic array; and (b) means for activating said strip portions in timed relation with the activation of said electro-optic array.

* * * * *

UNITED STATES PATENT AND TRADEMARK OFFICE
CERTIFICATE OF CORRECTION

PATENT NO. : 4,366,499
DATED : December 28, 1982
INVENTOR(S) : Jose M. MIR

It is certified that error appears in the above-identified patent and that said Letters Patent are hereby corrected as shown below:

Column 7, line 50, delete "discreet" and substitute therefor --discrete--;
    line 66, delete "tha" and substitute therefor --that--.

Signed and Sealed this

Twenty-second Day of March 1983

[SEAL]

Attest:

GERALD J. MOSSINGHOFF

Attesting Officer        Commissioner of Patents and Trademarks